(12) United States Patent
Kingston

(10) Patent No.: US 7,576,985 B2  
(45) Date of Patent: Aug. 18, 2009

(54) RAPID COOLING OF EXHAUST FROM ARC RESISTANT ELECTRICAL EQUIPMENT

(75) Inventor: Murray Peter Kingston, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/949,254

(22) Filed: Dec. 3, 2007

(65) Prior Publication Data

US 2009/0141432 A1 Jun. 4, 2009

(51) Int. Cl.
  *H05K 7/20* (2006.01)
(52) U.S. Cl. .............. 361/690; 361/676; 361/677; 361/678; 361/705; 174/16.1; 165/104.33
(58) Field of Classification Search .............. None
  See application file for complete search history.

(56) References Cited

U.S. PATENT DOCUMENTS

| | | | |
|---|---|---|---|
| 6,397,618 B1 * | 6/2002 | Chu et al. .................. 62/259.2 |
| 6,410,982 B1 * | 6/2002 | Brownell et al. ............. 257/174 |
| 6,865,085 B1 * | 3/2005 | Ferris et al. ................. 361/721 |
| 7,286,356 B2 * | 10/2007 | Keenan et al. .............. 361/700 |
| 7,327,578 B2 * | 2/2008 | Novotny ..................... 361/724 |
| 7,505,269 B1 * | 3/2009 | Cosley et al. ............... 361/700 |
| 2009/0086434 A1 * | 4/2009 | Hodes et al. ................ 361/700 |

OTHER PUBLICATIONS

Sliney, Strom, and Allen, Fused Fluoride Coatings as Solid Lubricants in Liquid Sodium, Hydrogen, Vacuum, and Air, NASA Technical Note D-2348, Aug. 1964.

* cited by examiner

*Primary Examiner*—Boris L Chervinsky
(74) *Attorney, Agent, or Firm*—Fletcher Yoder LLP; Alexander R. Kuszewski

(57) ABSTRACT

A system and method are provided for cooling exhaust from a power center, such as in the event of an arc fault. In one embodiment, a system is provided that includes a power center having an enclosure, an exhaust duct coupled to the enclosure, and a phase change material disposed in the enclosure, the exhaust duct, or both, wherein the phase change material is configured to rapidly cool exhaust in response to a high temperature in the enclosure. A method is provided that includes cooling an exhaust at a high temperature from a power center by changing phase of a phase change material from a solid to a vapor. Another method is provided that includes providing a phase change material configured to cool an exhaust at a high temperature from a power center by changing phase from a solid to a vapor.

25 Claims, 8 Drawing Sheets

RAPID COOLING OF EXHAUST FROM ARC RESISTANT ELECTRICAL EQUIPMENT

BACKGROUND

The invention relates generally to the field of power supply, such as that to motor control centers (MCCs). Specifically, the invention relates to techniques for containing and minimizing the consequences of arc faults in such systems.

Systems that distribute electrical power for residential, commercial, and industrial uses can be complex and widely divergent in design and operation. Electrical power generated at a power plant may be processed and distributed via substations, transformers, power lines, and so forth, prior to receipt by the end user. The user may receive the power over a wide range of voltages, depending on availability, intended use, and other factors. In large commercial and industrial operations, the power may be supplied as three phase ac power (e.g., 208 to 690 volt ac, and higher) from a main power line to a power management system. Power distribution and control equipment then conditions the power and applied it to loads, such as electric motors and other equipment. In one exemplary approach, collective assemblies of protective devices, control devices, switchgear, controllers, and so forth are located in enclosures, sometimes referred to as "motor control centers" or "MCCs". Though the present technique is discussed in the context of MCCs, the technique may apply to power management systems in general, such as switchboards, switchgear, panelboards, pull boxes, junction boxes, cabinets, other electrical enclosures, and so forth.

The MCC may manage both application of electrical power, as well as data communication, to the loads, such loads typically including various machines or motors. Within the MCC may be disposed a variety of components or devices used in the operation and control of the loads. Exemplary devices contained within the MCC are motor starters, overload relays, circuit breakers, and solid-state motor control devices, such as variable frequency drives, programmable logic controllers, and so forth.

A problem in the operation of MCCs and other power management systems, such as switchboards and panelboards, is the occurrence of arcing (also called an arc, arc fault, arcing fault, arc flash, arcing flash, etc.) which may be thought of as an electrical conduction or short circuit through gas or air. Initiation of an arc fault may be caused by a momentary or loose connection, build-up of foreign matter such as dust or dirt mixed with moisture, insulation failure, or a short-circuit (e.g., a foreign object, such as a tool or a rodent, establishing an unwanted connection between phases or from a phase to ground) which causes the arc to be drawn, and so forth. Once initiated, arcing faults may proceed in a substantially continuous manner. On the other hand, arcing faults may be intermittent failures between phases or phase-to-ground, and may be discontinuous currents that alternately strike, extinguish, and strike again.

In either case, the result is an intense thermal event (e.g., temperatures up to 8800° C. (16,000° F.)) causing melting and vaporization of metals. An arcing fault is an extremely rapid chain of events releasing tremendous energy in a fraction of a second, and is known for quick propagation. Once the arcing begins, heat is generated and ionized gases are produced that provide a medium by which the arcing fault can propagate. An arc may travel along one conductor and jump to other conductors, melting and/or vaporizing the conductors. As a result, more ionized gas and arcing may be created, engulfing all three phases and reaching the power buses. A phase-to-ground or phase-to-phase arcing fault can quickly escalate into a three-phase arcing fault due to the extensive cloud of conductive metal vapor which can surround the power leads and terminals. If not contained, the arc may propagate throughout the entire MCC, especially if the arc reaches the power buses. Arcing faults can cause damage to equipment and facilities, and drive up costs due to lost production.

It has been well documented that incident energy of an arcing fault is directly proportional to the time the fault persists. As the arcing fault flows for 6, 12, or 30 cycles or more, for example, the incident energy and force of the arc fault increases dramatically. Thus, circuit breakers, for example, on the line side operating with typical time delays (e.g., greater than 6 cycles) may be problematic with arcing faults. In general, it is desirable that the arcing fault be extinguished in a short time, such as within 6 cycles, and in certain applications, in less than 2 cycles. Testing has shown that if the arc (e.g., for 65,000 amps available current at 480 volts) does not extinguish quickly (e.g., in less than 0.1 seconds or six cycles), it can cause extensive damage. Moreover, although the amount of energy released in an arc flash may be greater for higher voltage installations, such as those found in petrochemical and other industrial plants, the sheer volume of lower voltage equipment in commercial and industrial facilities means that such installations account for a great number of arc flash incidents. Thus, there has been interest in arc flash protection for medium and low voltage MCCs, in addition to interest for protection of high voltage systems. Finally, as known by those skilled in the art, there are several industry and regulatory standards around the world that govern arc flash prevention.

Some MCC's route the hot gases and vaporized metals generated by the arc fault to an exhaust plenum. The exhaust plenum, also referred to as an exhaust ducting, may route the exhaust to the atmosphere or to an enclosure or room designed to contain the heat and pressure generated by the arc fault. In many instances, the exhaust from the arc fault may manifest itself as a flame exiting from the exhaust. However, for some installations using MCC's, such as petrochemical facilities, it may be undesirable to have a flame exhausting outside of the electrical room. Additionally, an exhaust plenum open to the atmosphere may allow for ingress of water from outside which may result in damage to the MCC or other equipment in the electrical control room. Further, the length and/or size of the exhaust ducting required to provide sufficient venting capabilities may limit the space available for cable trays and other equipment in the control room.

BRIEF DESCRIPTION

In one embodiment, a system is provided that includes a power center. The power center includes an enclosure, an exhaust duct coupled to the enclosure, and a phase change material disposed in the enclosure, the exhaust duct, or both, wherein the phase change material is configured to rapidly cool exhaust in response to a high temperature in the enclosure.

In another embodiment, a method is provided that cooling an exhaust at a high temperature from a power center by changing phase of a phase change material from a solid to a vapor.

Another method is provided that includes providing a phase change material configured to cool an exhaust at a high temperature from a power center by changing phase from a solid to a vapor.

In another embodiment, a duct for a power center is provided that includes a duct section configured to couple with a power center and a phase change material comprising lithium fluoride disposed in the duct section.

In yet another embodiment, a high temperature coolant for a power center is provided. The coolant includes a phase change material comprising a metallic salt configured to absorb heat by changing phase from a solid to a vapor in response to an electrical arc event in the power center.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
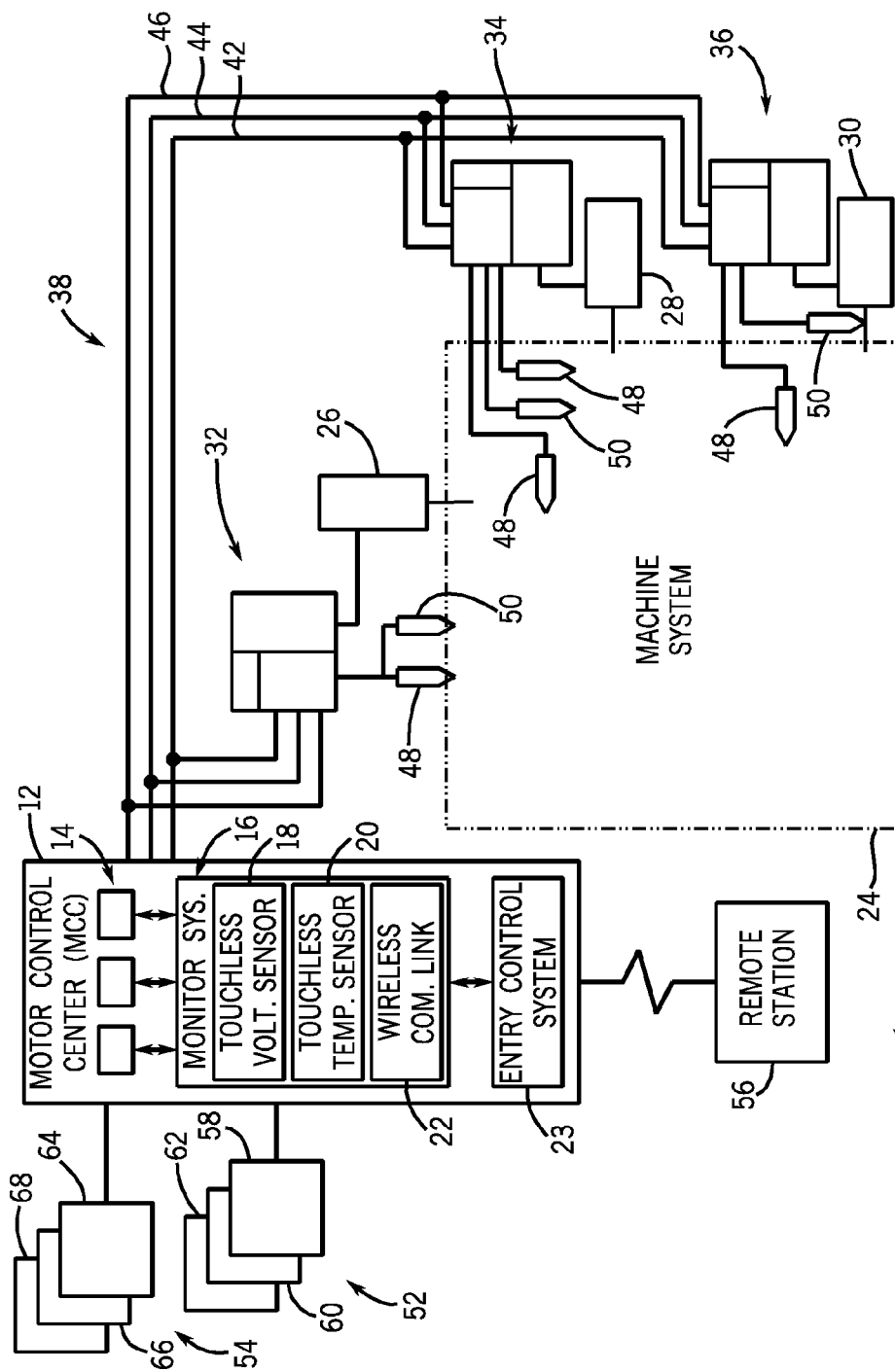
FIG. 1 is a block diagram of an exemplary system having a plurality of components, e.g., motors, networked together via a motor control center.

Turning to the figures, FIG. 1 is a diagram illustrating an exemplary system 10 having a power distribution center, e.g., a motor control center (MCC) 12, with various control circuitry and components 14 and a monitoring system 16. As discussed in detail below, the monitoring system 16 may include one or more voltage sensors 18, one or more temperature sensors 20, and one or more wireless communication links 22. In addition, the system 10 includes features such as a phase change material (PCM) to rapidly cooling exhaust in the event of an arc fault event. For example, the phase change material (PCM), e.g., solid form of lithium fluoride, may be disposed in duct work coupled to the MCC 12. The phase change material may rapidly absorb intense heat by first melting and then boiling thereby sufficiently lowering the temperature of the exhaust to enable released within the facility. The phase change material (PCM), duct work, and other cooling features are disclosed further below.

These sensors 18 and 20 are configured to monitor voltage and temperature of individual wires/components, or groups of wires/components, or the entire set of wires/components within the MCC 12. In addition, the illustrated MCC 12 includes an entry control system 23 configured to cooperate with the monitoring system 16 to control access to the interior of the MCC 12. Together, the monitoring system 16 and the entry control system 23 automatically protect an operator from hazardous voltages inside the MCC 12. However, the monitoring system 16 may be implemented without the entry control system 23 or with an external display, handheld service unit, or other local or remote indication of the internal operating conditions of the MCC 12. Similarly, the entry control system 23 may be implemented with other types of sensors, such as voltage sensors directly connected to (e.g., in contact with) the specific components (or wires) within the MCC 12.

Thus, the specific components, subcomponents, wires, hot-spots, and so forth may be individually monitored for temperature and voltage without opening the MCC 12, thereby improving the safety, reliability, and performance of the system 10. In other words, the MCC 12 can remain completely closed and locked while the operator receives the voltage and temperature data at a protected position outside of the MCC 12. The voltage data automatically measured from within the confines of the MCC 12 also may be used to control access to the MCC 12 via the entry control system 23. For example, if the voltage sensors 18 detect that the MCC 12 is active (e.g., voltage is still passing through the MCC 12), then the entry control system 23 generally locks down the MCC 12 to prevent operator access. In this manner, the operator is automatically isolated or protected from hazardous voltages inside the MCC 12. If the voltage sensors 18 detect that the MCC 12 is shut down (e.g., no voltage or primary voltage is cut), then the entry control system 23 identifies the condition as safe and permits access to the interior of (e.g., unlocks) the MCC 12.

The system 10 may comprise a variety of applications and machinery. For example, the system 10 may comprise one or more commercial or industrial applications, such as manufacturing, processing, distributing, material handling, mining, petrochemical processing, and transportation. Moreover, these applications may entail a variety of products, such as food, beverages, clothing, consumer products, automotive, marine, aircraft (e.g., airport baggage), water, sewage and waste products, petroleum, and so forth. The actual machinery and components employed in the system 10 may comprise one or more motors, pumps, compressors, heating devices, cooling devices, gearing mechanisms, conveyors, robotics, overhead carriers, manufacturing devices (e.g., machining devices), sorting mechanisms, labeling mechanisms, sensors, actuators, solenoids, valves, magnetic starters, relays, and so forth. Accordingly, although specific embodiments are described in further detail below, the present techniques are intended for use in a variety of contexts.

As illustrated, the system 10 comprises a machine system 24 having a plurality of motors or machines 26, 28, and 30. In turn, the machines 26, 28, and 30 comprise on-machine controllers 32, 34, and 36, which are coupled to the MCC 12 via a power and data distribution system 38. In other words, the machines 26, 28, and 30 are generally wired or networked together via the distribution system 38 and the MCC 12. In some embodiments, the distribution system 38 includes direct wires or discrete signal wires leading to the respective machines 26, 28, and 30. In operation, the on-machine controllers 32, 34, and 36 are engageable locally or remotely via the MCC 12 to monitor, process, diagnose, service, or generally control the respective motors or machines 26, 28, 30. Moreover, the illustrated MCC 12 may comprise a variety of hardware and software adapted for monitoring, processing, diagnosing, or generally controlling the system 10. The illustrated system 38 comprises a plurality of data and power lines, such as lines 42, 44, and 46. Using the on-machine controllers 32, 34, and 36 and/or the MCC 12, these lines 42, 44, and 46 facilitate operation and cooperation of the machine system 24, the motors or machines 26, 28, and 30, and a variety of input/output devices, such as sensors 48 and actuators 50.

In addition, the MCC 12 and/or the power and data distribution system 38 may be coupled to a variety of other local and remote MCCs, machine system, monitoring stations, or facilities, such as local MCCs 52 and 54 and remote station 56. For example, the local MCC 52 may have machines or motors 58, 60, and 62, while the local MCC 54 has machines or motors 64, 66, and 68. Again, these MCCs 52 and 54 may have a similar monitoring system 16 with various touchless voltage sensors 18, touchless temperature sensors 20, and wireless communication links 22. The machines or motors 58 through 68 also may have one or more on-machine controllers 32, 34, and 36. These sensors 18 and 20 and the wireless communication links 22 also may be distributed throughout the entire system 10 at various points in the machines or motors 26, 28, and 30, the on-machine controllers 32, 34, and 36, and so forth.

Regarding the wiring arrangement of the illustrated system 10, the lines 42, 44, and 46 may comprise a single phase or multiphase alternating current (AC) power supply line, a direct current (DC) power supply line, and a suitable data communication line. For example, the power and data distribution system 38 may distribute a three-phase 480 Volt AC power supply to one or more of the motors or machines 26, 28, and 30. In addition, the power and a distribution system 38 may distribute a different power supply, such as a single phase 120 Volt AC or a 24 Volt DC power supply, to one or more of the sensors 48 and actuators 50. The illustrated power and data distribution system 38 may comprise a variety of distributed machine networks, circuitry, and protocols, such as DeviceNet, DeviceLogix, ControlNet, EtherNet, and ControlLogix provided by Rockwell Automation, Inc. of Milwaukee, Wis.

Figure 2:
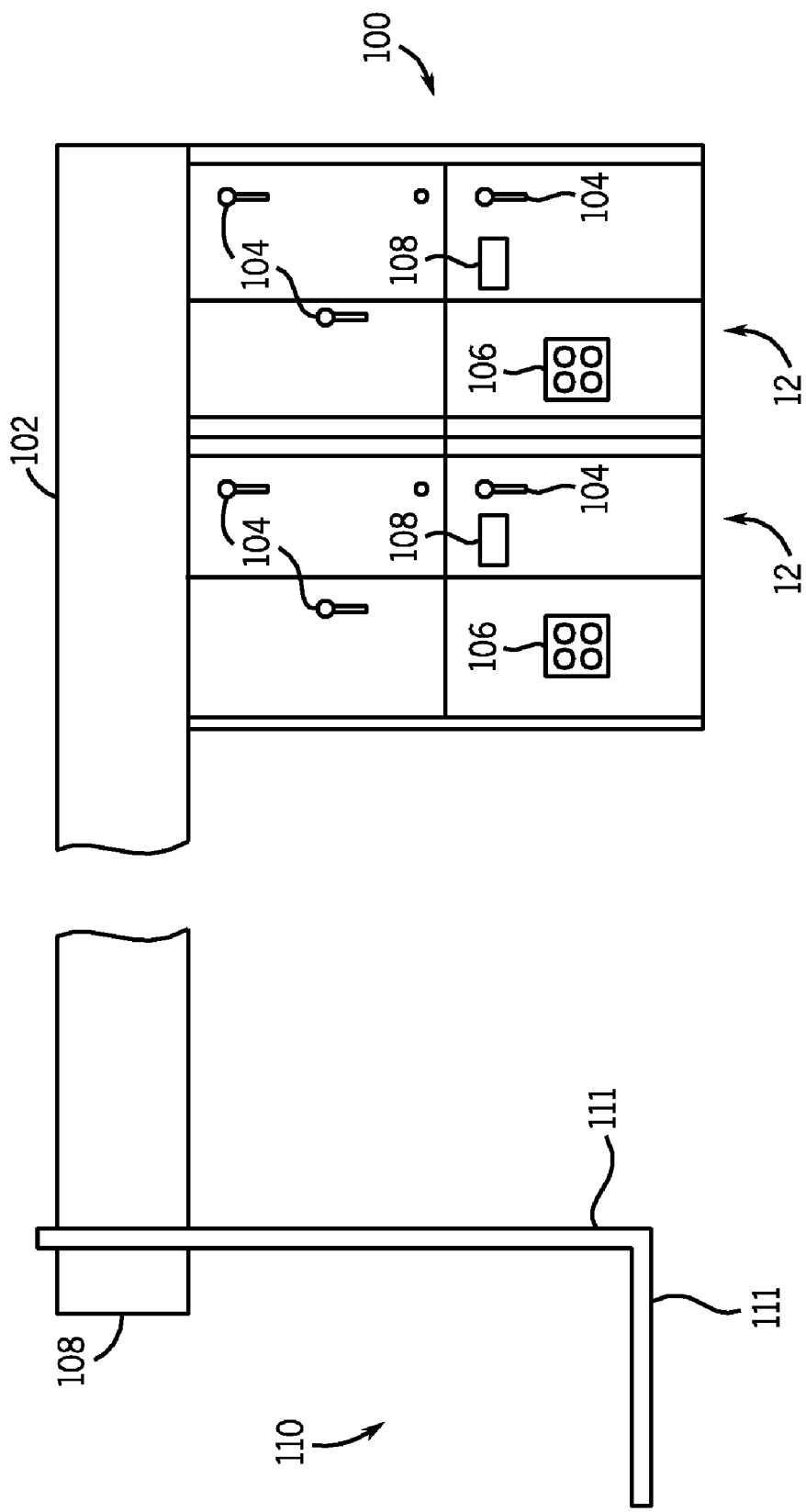
FIG. 2 is a front view of a row of exemplary motor control centers having an exhaust plenum in accordance with an embodiment of the present invention.

FIG. 2 is a front view of a row 100 of motor control centers 12 having a shared exhaust plenum 102 with rapid cooling features (e.g., a phase change material) in accordance with an embodiment of the present invention. The exhaust plenum 102 provides an outlet for any exhaust generated by the motor control centers 12, such as in the case of an arc fault. The row 100 may comprise any number of motor control centers 12, and the motor control centers 12 may be arranged in any configuration. For example, the motor control centers 12 may be arranged perpendicular to each other, parallel rows, perpendicular rows, or any other configuration. Such a configuration may be designed to minimize the footprint of the room in which the motor control centers 12 are located. Alternatively, the arrangement of the motor control centers 12 may be chosen so that the exit of the exhaust plenum 102 may be more conveniently located.

The front of the motor control centers 12 may include various control inputs, indicators, displays, electrical outputs, air outputs, and so forth. For example, in an embodiment, each motor control center 12 may have multiple access mechanisms 104, such as handles, knobs, etc. The access mechanisms 104 may be locked, such as with the key, padlock, or any other locking device. Alternatively, in some embodiments, the access mechanism 104 may be electronically locked, and/or access may be electronically controlled. Further, in an embodiment, each motor control center 12 may include a user input 106 that may include a button or knob configured to enable selection of a mode of operation, power on/off, emergency shutoff, adjustment of any parameter, or a combination thereof. The front of the motor control centers 12 may also include various indicators 108 to provide feedback to the user. For example, the indicators 108 may include one or more light emitting diodes (LED) and/or liquid crystal displays (LCD) to display on/off status, current level, voltage level, temperature, or any other parameter. Additionally, the indicators 108 may include an LED or LCD that displays a trouble or warning indicator if there is a problem with the motor control center 12.

As illustrated in FIG. 2, the exhaust plenum 102 is connected to the top of the motor control centers 12 and extends to the left of the row 100. In one embodiment, the plenum 102 may be formed from sheet metal ductwork. In other embodiments, the plenum 102 may be formed from aluminum or other metals, plastics, composites, ceramics, cermets, or any other suitable material. As discussed further below, the exhaust plenum 102 may be modular and may be configured to exit in any number of directions from the top of the row 100 of motor control centers 12. The exhaust plenum 102 may extend for any length, and the length may be adapted to the particular location of the motor control centers 12. The exhaust plenum 102 includes an outlet 108 through which any hot vapor, flame or other exhaust material may exit in the result of an arc fault. However, as discussed below, a phase change material may be used to rapidly cool the exhaust. Any number of plenums 102 or outlets 108 may be used. For example, in one embodiment, one outlet 108 may be used for every five motor control centers 12.

In the embodiment, the outlet 108 of the plenum 102 is directed to an external area 110 (e.g., environment and external to a building). For example, the external area 110 may be an area open to the outside, such as in a location designated as an arc fault relief location and appropriately blocked off from access. The external area 110 may be separated from the room containing the motor control centers 12 via reinforced walls 111. The walls 111 may be designed to withstand any pressure, heat, or other energy caused by an arc fault; thus, the walls 111 may safely isolate the motor control centers 12 from the hot vapor or other material exiting the outlet 108 in the case of an arc fault.

In other embodiments, the outlet 108 of the plenum 102 may be directed to an internal area, such as a containment room. The containment room may include any number of devices to safely reduce or absorb the hot gases and flames exiting the outlet 108 in the event of an arc fault. For example, the containment room may include fire suppression devices, such as water sprinklers or foam sprayers, and may include its own exhaust or active venting system to remove the hot gases and relieve temperature or pressure. In addition, a phase change material (PCM) may be disposed in the Plenum 102 and/or elsewhere to compete for purposes of rapidly cooling the intense heat of the exhaust.

Figure 3:
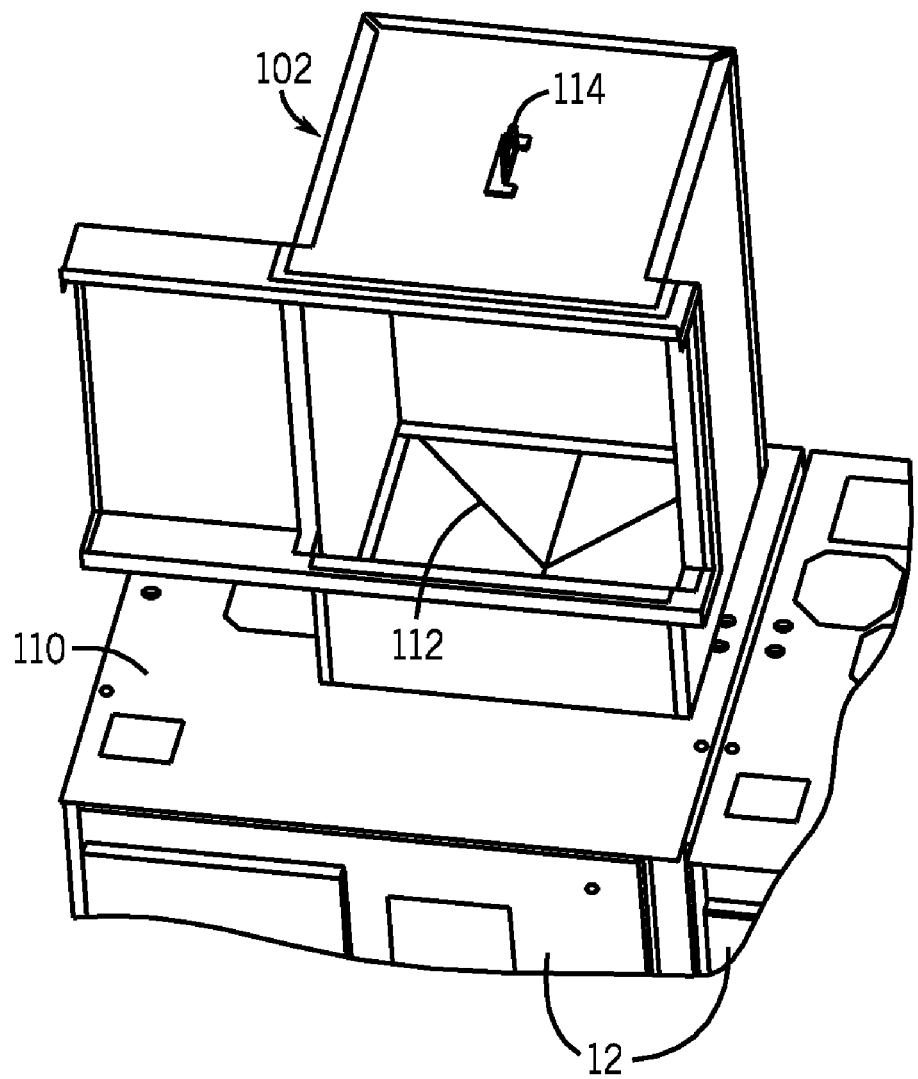
FIG. 3 is a perspective view of a connection between an exhaust plenum and the top of a motor control center in accordance with an embodiment of the present invention.

FIG. 3 is a perspective view of the connection between the plenum 102 and the top 110 of the motor control center 12. In one embodiment, the top 110 of the motor control center 12 or the plenum 102 may include a pressure relief plate 112. The aluminum pressure relief plate remains intact during normal operation of the motor control center 12, thus preventing water, debris, animals, or other items which may enter the plenum 102 through the outlet from entering into the motor control center 12. In the event of an arc fault, the pressure relief plate 112 will open as a result of the high pressure of the vapor and flame exiting the motor control center 12. In one embodiment, the pressure relief plate 102 may be formed from aluminum. In other embodiments, the pressure relief plate 102 may be formed from other metals, composites, ceramics, cermets, or any other suitable material. In yet other embodiments, a pressure relief valve, hinged panel, or other pressure relief device may be used instead of a pressure relief plate.

The plenum 102 may include a mechanical support attachment 114 allowing support of the plenum 102 from the ceiling, wall, or floor of the electrical control room. For example, the plenum 102 may include flanges for installing hangers or may include holes for other any other type of mechanical support. Additionally, the supports may also act as bracing mechanisms in the event of an arc fault, or additional bracing mechanisms may be used. The number and type of supports, and the number and type of bracings, may depend on how the plenum 102 is supported at its outlet as well as the distance of the outlet from the motor control centers 12. Again, as discussed further below, a phase change material (PCM) may be disposed in the flow path of exhaust downstream of the pressure relief plate 112.

Figure 4:
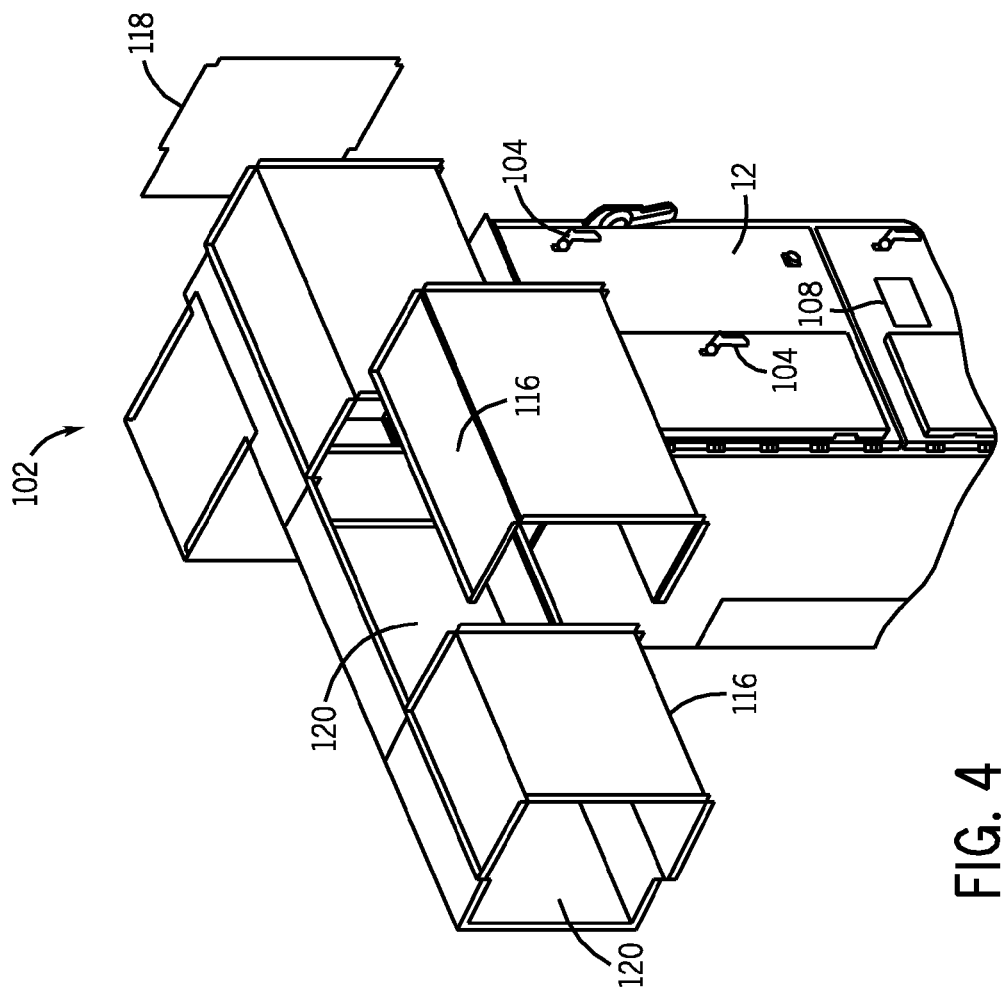
FIG. 4 is a perspective view of an exploded exhaust plenum and a motor control center in accordance with an embodiment of the present invention.

FIG. 4 is a perspective view of an exploded plenum 102 in accordance with an embodiment of the present invention. The plenum 102 may be assembled from one or more plenum extensions 116 so that the outlet of the plenum 102 reaches the appropriate internal or external area. To ensure that the hot gases and flames exit at the outlet, one end of the plenum 102 may be covered with an end cover 118. The end cover 118 may be riveted, welded or otherwise fastened to the plenum 102 to ensure the end cover 118 remains secured in the event of an arc fault.

The plenum 102 and plenum extensions 116 may be different sizes or shapes. For example, in some embodiments, the plenum 102 may have a length of 18 inches, 26 inches, 36 inches, etc. Additionally, the plenum extension may have a length of 18 inches, 26 inches, 36 inches, etc. Further, the plenum extensions 116 may be any number of shapes, such as 90° elbows, 45° turns, U-turns, etc. Thus, the plenum 102 may be directed horizontally, vertically, or through any desired routing to ensure safe and effective release of the arc fault exhaust.

As discussed above, the gases exiting the plenum 102 in the event of an arc fault are typically at a relatively high temperature and pressure. For example, such gases may reach temperatures of 8800° C. (16,000° F.). Therefore, in some environments, the venting of such high temperature and pressure gases may create an even larger hazard than the arc fault itself. In petrochemical facilities, for example, flames present in the arc exhaust cannot exit the electrical control rooms without causing potentially more damage.

In one embodiment, to rapidly cool the hot vapor exiting through the exhaust plenum 102, a phase change material (PCM), such as a metallic salt, maybe provided within the exhaust plenum 102. For example, in one embodiment, lithium fluoride may be used to provide rapid cooling of the exhaust from the arc fault. In other embodiments, the phase change material may include magnesium fluoride, sodium fluoride, or any other suitable metallic salt, or a combination thereof.

The selection of the metallic salt or other phase change material to be used may be determined from the desired temperature of the exhaust at the outlet of the plenum 102 and the expected energy release during the arc fault. For example, lithium fluoride has a melting point of 848° C., a boiling point of 1,676° C., a density of 2,640 kg/m$^3$, and a specific heat is 1,562 J/kg K. If the base operating temperature of the plenum 102 is 40° C., then the energy required to raise the lithium fluoride salt from 40° C. to its boiling point of 1,676° C. is 2555 kJ/kg. Further, for a motor control center 12 having a line voltage of 6,900 V, a current of 40,000 A, an arc fault duration of 0.5 s, the maximum energy released during an arc fault has been measured by testing to be about 13 MJ. Thus, if the desired temperature at the outlet of the plenum 102 is 1676° C., and 100% of the energy of the arc fault is assumed to be directed to the plenum 102, then a suitable amount of lithium fluoride would be about (13,000 kJ)/(2555 kJ/kg)=5.1 kg. Similarly, the properties of any other metallic salt or phase change material may by analyzed to determine both the appropriate material for the desired temperature and the amount of material suitable for placement in the plenum 102.

The lithium fluoride or other phase change material may be provided in the plenum 102 via any suitable mechanism. For example, in the embodiment depicted in FIG. 3, the lithium fluoride may be coated on the interior walls 120 of the plenum 102 and plenum extensions 116. The lithium fluoride can be mixed with water and sprayed onto a metal surface, allowing the water to evaporate and leave a coating on the metal. In other embodiment, the lithium fluoride may be dipped, deposited or applied to the metal via any suitable technique or combination thereof. The lithium fluoride may be applied directly to the interior walls 120, or, in other embodiments, the lithium fluoride may be packaged, such as in a thin plastic film, and then applied to the interior walls 120. During an arc fault, the thin plastic film will melt as a result of coming into contact with the hot vapor, thus exposing the vapor to the lithium fluoride and resulting in a phase change. Additionally, because of the increase in pressure as a result of the phase change of the lithium fluoride or other phase change material, the number and type of supports, the number and type of bracings, and the cross-section of the ducting may be chosen to compensate for the increase in pressure.

Figure 5A:
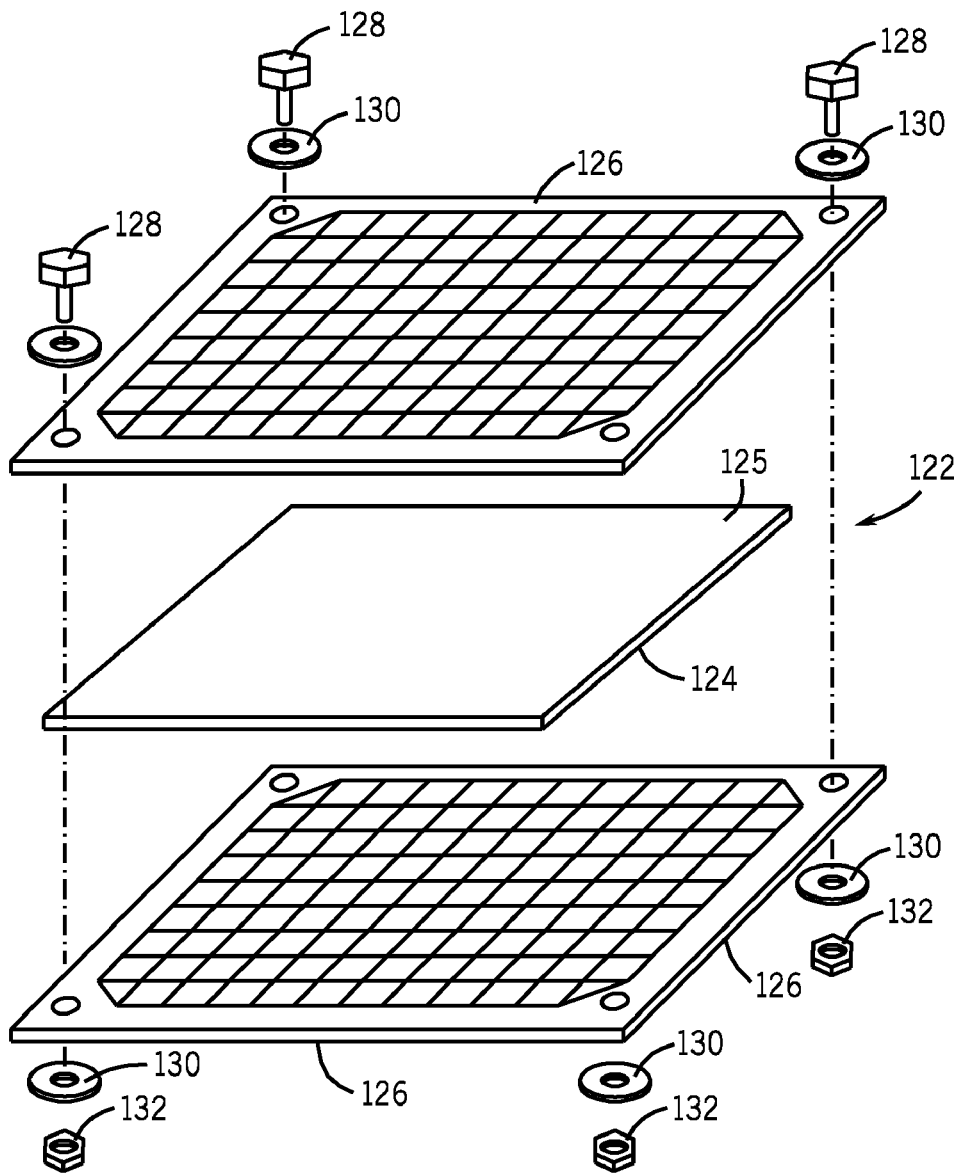
FIGS. 5A-5C are perspective views of an exhaust plenum having a rack assembly to secure a phase change material in accordance with an embodiment of the present invention.
Figure 5B:
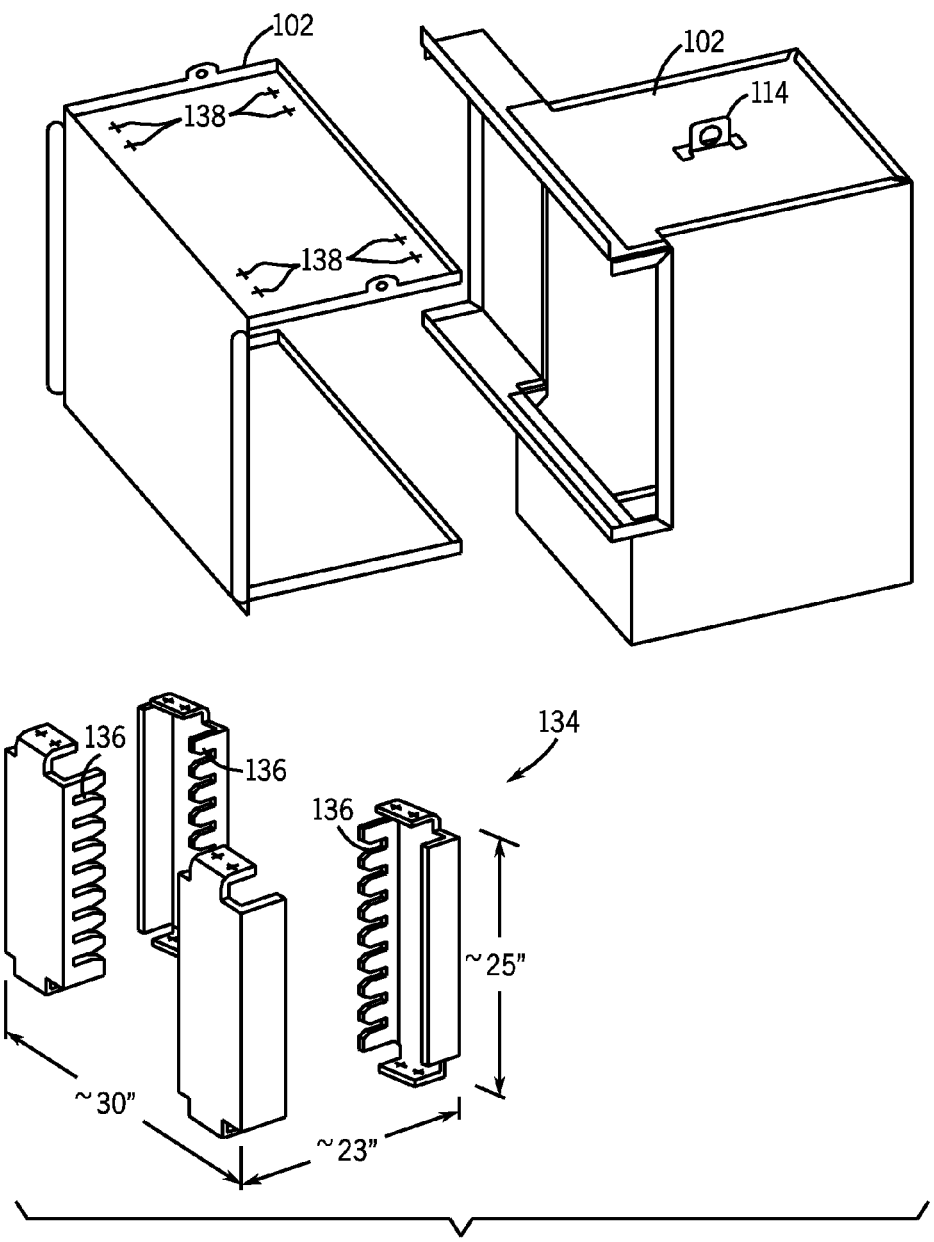
Figure 5C:
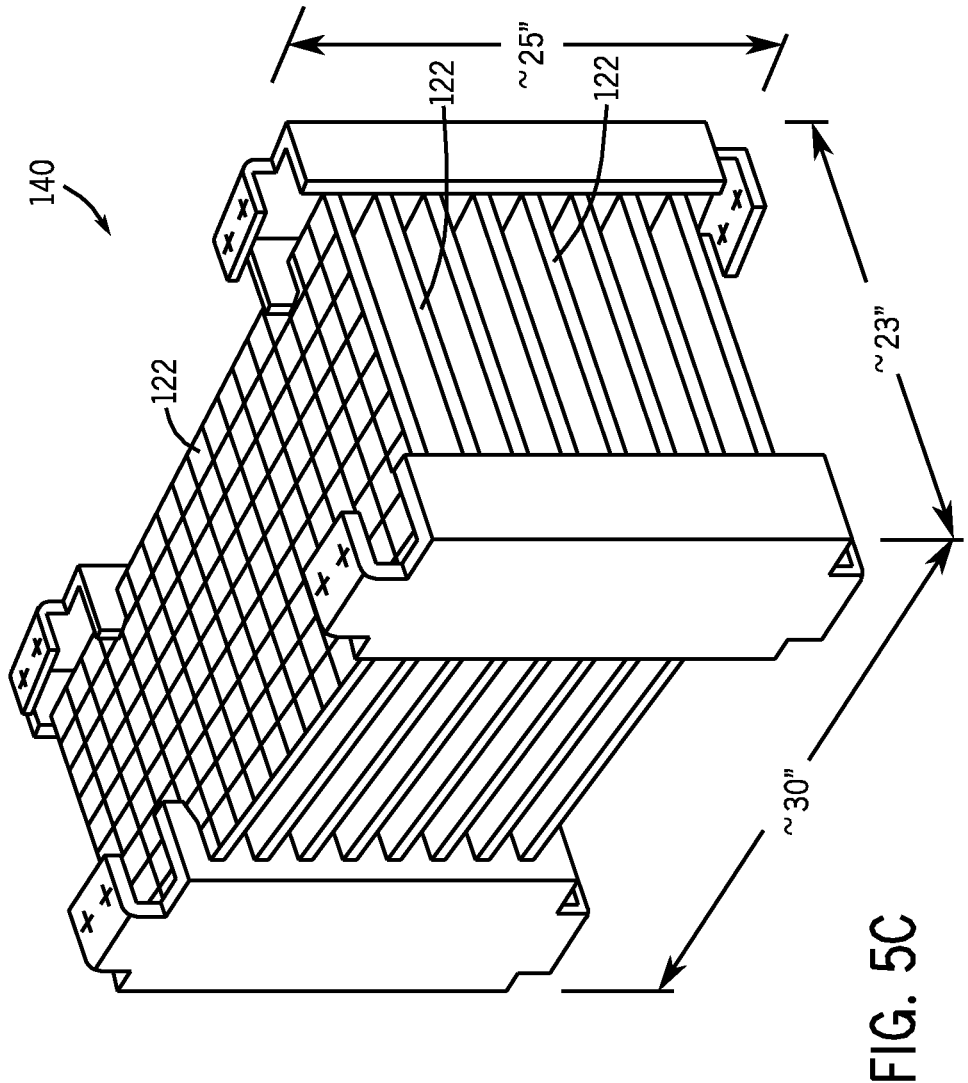

FIGS. 5A-C depict another embodiment for providing a phase change material (PCM) in the plenum 102. In the embodiment, multiple racks 122 of lithium fluoride are suspended in the plenum 102. The racks 122 may be coated with the phase change material, such as lithium fluoride, or the phase change material may be packaged in a thin plastic film and secured the racks 122. Advantageously, use of multiple racks 122 in suspension allows the exhaust from an arc fault event to contact both sides of the racks 122, thus maximizing the surface area of the phase change material exposed to the exhaust.

Turning now to the assembly of the rack 122, FIG. 5A illustrates a thin sheet of lithium fluoride powder 124 packaged in a thin plastic film 125. To secure the package 124, the package 124 may be sandwiched between wire screens 126 such that the package is held firmly. The wire screens 126 and package 124 may be held together through the use of bolts 128, washers 130, and nuts 132. Alternatively, any other fastening mechanism may be used, such as stapling, welding, tying, etc. The wire screens 126 provide openings for the hot gas and other material from an arc fault to contact the package 124 between the wire screens. As discussed above, upon such contact the plastic film will melt and the lithium fluoride or other phase change material will contact the hot gas and other material and absorb heat, thus changing phase.

FIGS. 5B and 5C illustrate an attachment mechanism for securing the rack 122 of FIG. 5A to the plenum 102. To hold the rack within the plenum 102, a cage 134 may be assembled that provides slots 136 for the rack 122. The cage 134 may be formed from sheet metal, aluminum, any other metal, plastic, composite, ceramic, cermet, or any suitable material that can withstand the temperature and pressure of the exhaust from an arc fault. The cage 134 may be secured to the plenum 102 (or a plenum extension 116) via mounting holes 138 on the top and bottom of the plenum 102. The cage 134 may be secured via nuts and bolts, screws, or any other attachment mechanism. As shown in FIG. 5C, an assembled cage 140 may have multiple racks 122. The assembled cage 140 may then be installed in the plenum 102 (or plenum extensions) using the mounting holes 138. In one embodiment, the assembled cage 140 may have a width of 23 inches, a length of 30 inches, and a height of 25 inches.

Figure 6:
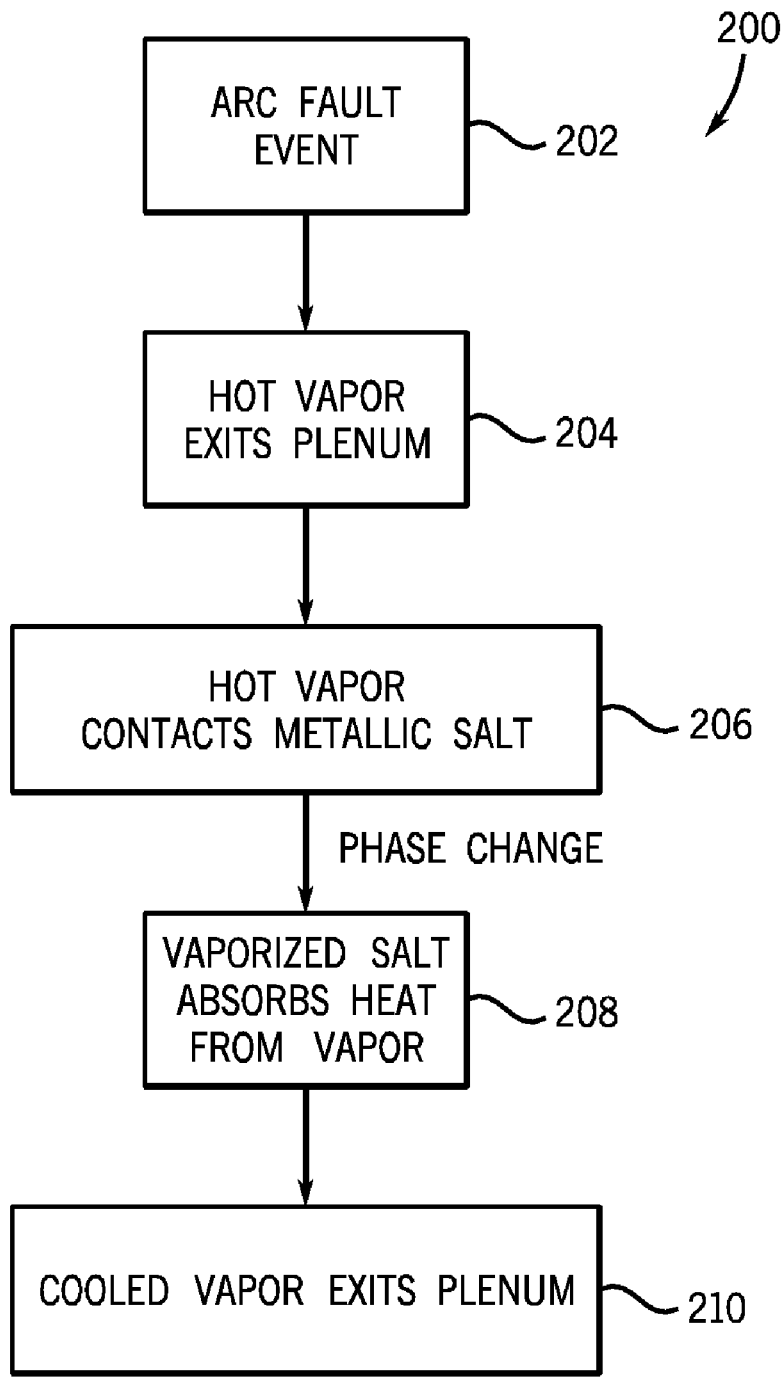
FIG. 6 is a flowchart of a process for rapidly cooling exhaust from an arc fault event in accordance with an embodiment of the present invention.

FIG. 6 is a flow chart 200 of a process for rapidly cooling exhaust from an arc fault event occurring in the motor control center 12 in accordance with an embodiment of the present invention. Initially, an arc fault event may occur as a result of a short inside the motor control center 12 (block 202). For example, a rodent or other animal may crawl inside the motor control center 12 and destroy insulation and short itself across high-current wires within the motor control center 12. As a result of the arc fault, a large amount of heat and energy is released, potentially vaporizing the metal conductors and the material inside the motor control center 12.

As a result of the high temperature and pressure of the vaporized metal and other material, the pressure relief plate 112 at the top of the motor control center 12 opens to relieve the pressure. The hot vapor then exits the motor control center 12 through the plenum 102 at extremely high temperature (204). As it passes through the plenum 102, the hot vapor then comes into contact with the phase change material (PCM), such as the metallic salts discussed above (block 206). The hot vapor may contact the phase change materials directly, or may melt a thin plastic film or other packaging over the phase change material, thus enabling contact between the two materials.

As the phase change material absorbs the heat and energy from the hot vapor, the material changes phase, going from a solid to liquid to a vapor in a few seconds. Thus, the absorption of the excess heat and energy from the hot vapor lowers the temperature of the hot vapor before it exits the plenum 102 (block 208). After the vapor is cooled, it exits the plenum 102 to an external or internal area relative to the room and/or building having the motor control center 12, as described above (block 210). However, because the vapor has been cooled by the phase change material, the safety requirements for the exit area, whether internal or external, may be less stringent and less costly to implement. Further, it should be appreciated that use of a phase change material in an exhaust is applicable to other high-power systems susceptible to arc faults are other high-energy incidents.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
 a power center, comprising:
  an enclosure;
  an exhaust duct coupled to the enclosure; and
  a phase change material disposed in the enclosure, the exhaust duct, or both, wherein the phase change material is configured to rapidly cool exhaust in response to a high temperature in the enclosure.

2. The system of claim 1, wherein the phase change material comprises a solid during normal operation of the power distribution center, and the phase change material changes phase from the solid to a vapor in response to the high temperature of the exhaust.

3. The system of claim 1, wherein the phase change material consists essentially of a metallic salt.

4. The system of claim 3, wherein the phase change material consists essentially of lithium fluoride.

5. The system of claim 1, wherein the phase change material comprises a layer directly adhered to a surface.

6. The system of claim 1, wherein the phase change material is suspended in a flow path of the exhaust from the enclosure to an outlet of the exhaust duct.

7. The system of claim 1, wherein the phase change material is at least substantially or entirely enclosed by a plurality of thin plastic films.

8. The system of claim 1, comprising a rack supporting a plurality of screens within the exhaust duct, wherein a plurality of sheets of the phase change material are supported by the plurality of screens.

9. The system of claim 1, wherein the exhaust duct comprises a pressure relief device.

10. The system of claim 1, wherein the power center is configured to manage greater than 1000 V and the high temperature is greater than 1000 degrees Celcius.

11. A method, comprising:
 cooling an exhaust at a high temperature from a power center by changing phase of a phase change material from a solid to a vapor.

12. The method of claim 11, wherein cooling the exhaust comprises reducing heat generated in response to an arcing event within the power center.

13. The method of claim 11, wherein cooling the exhaust comprises melting and boiling the phase change material to absorb heat.

14. The method of claim 11, wherein the phase change material consists essentially of a metallic salt.

15. The method of claim 14, wherein the phase change material consists essentially of lithium fluoride.

16. The method of claim 11, comprising ducting the exhaust away from the power center while cooling the exhaust with the phase change material.

17. The method of claim 16, wherein ducting the exhaust comprises releasing the exhaust away from the power center while still within a room and/or building containing the power center.

18. A method, comprising:
 providing a phase change material configured to cool an exhaust at a high temperature from a power center by changing phase from a solid to a vapor.

19. The method of claim 18, comprising at least substantially or entirely enclosing the phase change material within a thin layer of plastic.

20. The method of claim 18, comprising mounting, coating, suspending, or a combination thereof, the phase change material in an enclosure of the power center, an exhaust duct coupled to the enclosure, or both.

21. A duct for a power center, comprising:
 a duct section configured to couple with a power center; and
 a phase change material comprising lithium fluoride disposed in the duct section.

22. The duct of claim 21, wherein the duct comprises a layer of the phase change material directly adhered to an interior surface of the duct.

23. The duct of claim 21, wherein the duct comprises a mount suspended within a volume of the duct, and a sheet of the phase change material is supported on the mount.

24. A high temperature coolant for a power center, comprising:
 a phase change material comprising a metallic salt configured to absorb heat by changing phase from in response to an electrical arc event in the power center.

25. The high temperature coolant of claim 24, wherein the phase change material is surrounded by a plastic film and is mounted on a screen.

* * * * *